(No Model.) 5 Sheets—Sheet 2.

G. N. TODD.
COTTON HARVESTER.

No. 453,351. Patented June 2, 1891.

Witnesses.
Will R Omohundro
W W Elliott

Inventor
George N Todd
By Jno. G. Elliott
Atty.

(No Model.) 5 Sheets—Sheet 3.

G. N. TODD.
COTTON HARVESTER.

No. 453,351. Patented June 2, 1891.

Witnesses.

Inventor
George N. Todd
By Jno. G. Elliott
Atty (No Model.) 5 Sheets—Sheet 4.
G. N. TODD.
COTTON HARVESTER.
No. 453,351. Patented June 2, 1891.
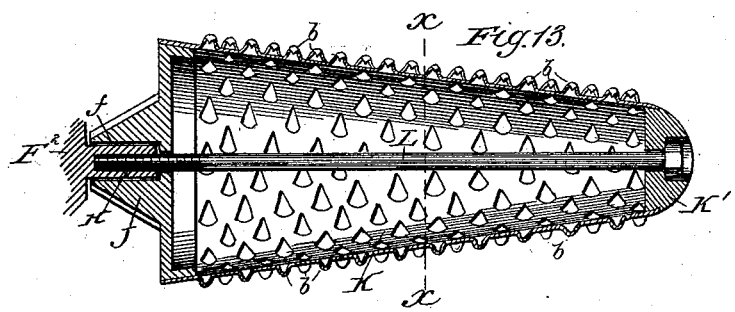
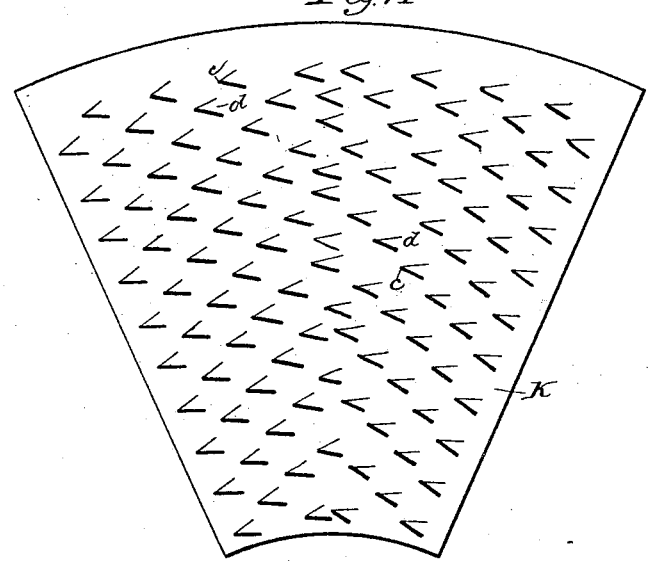
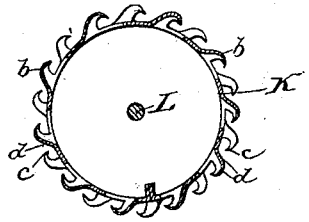
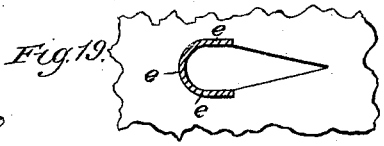
Witnesses.
Inventor.
George N. Todd
By, Jno. G. Elliott
Atty.

(No Model.)  5 Sheets—Sheet 5.

G. N. TODD.
COTTON HARVESTER.

No. 453,351.  Patented June 2, 1891.

Witnesses.  Inventor.
Will R. Onohundro.  George N. Todd
W. Rossiter  By Jno. G. Elliott
    Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

COTTON-HARVESTER.

SPECIFICATION forming part of Letters Patent No. 453,351, dated June 2, 1891.

Application filed June 23, 1885. Renewed March 16, 1891. Serial No. 385,269. (No model.)

*To all whom it may concern:*

Be it known that I, GEORGE N. TODD, a citizen of the United States, residing in Chicago, county of Cook, and State of Illinois, have invented certain new and useful Improvements in Cotton-Harvesters, of which the following is a specification.

This invention relates to improvements in cotton-harvesters provided with picker-stems which revolve about their own axes and which are caused to enter the bush from both sides in a horizontal plane.

The objects of this invention are, first, to have a supporting-frame for a cotton-harvester of a new and novel construction adapted and arranged to carry the rotatable picker-stem supports whereby the cotton may be gathered by an inward thrust of the picker-stems into the cotton-plants from both sides in a horizontal plane, to remove the gathered cotton from the picker-stems by means of a traveling belt or belts located in the path of movement of said stems, and, finally, to provide certain novel details in the carrying out of my invention, all as hereinafter fully described and claimed. I attain these objects by devices illustrated in the accompanying drawings, in which—

Figure 1:
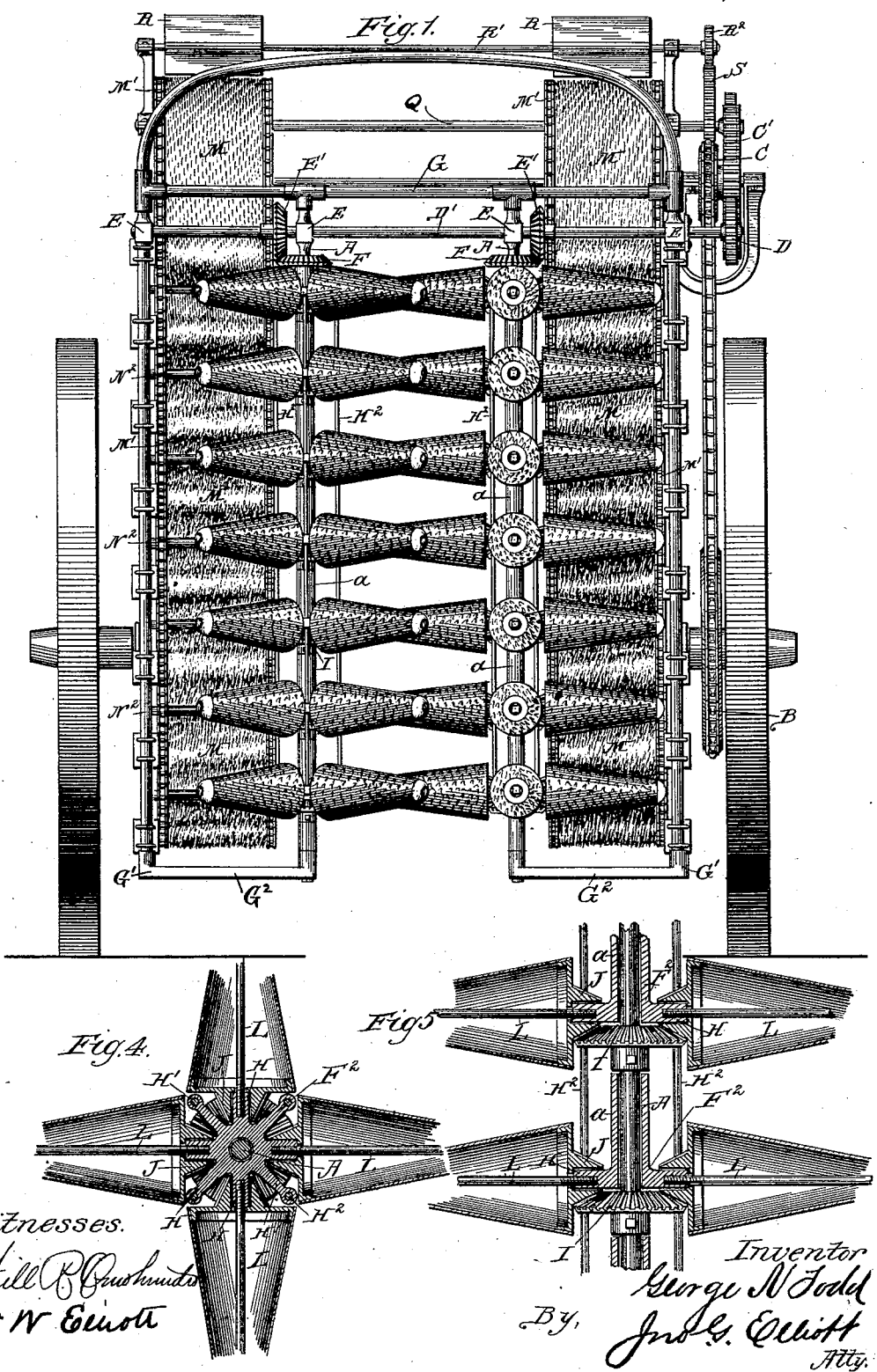
Figure 2:
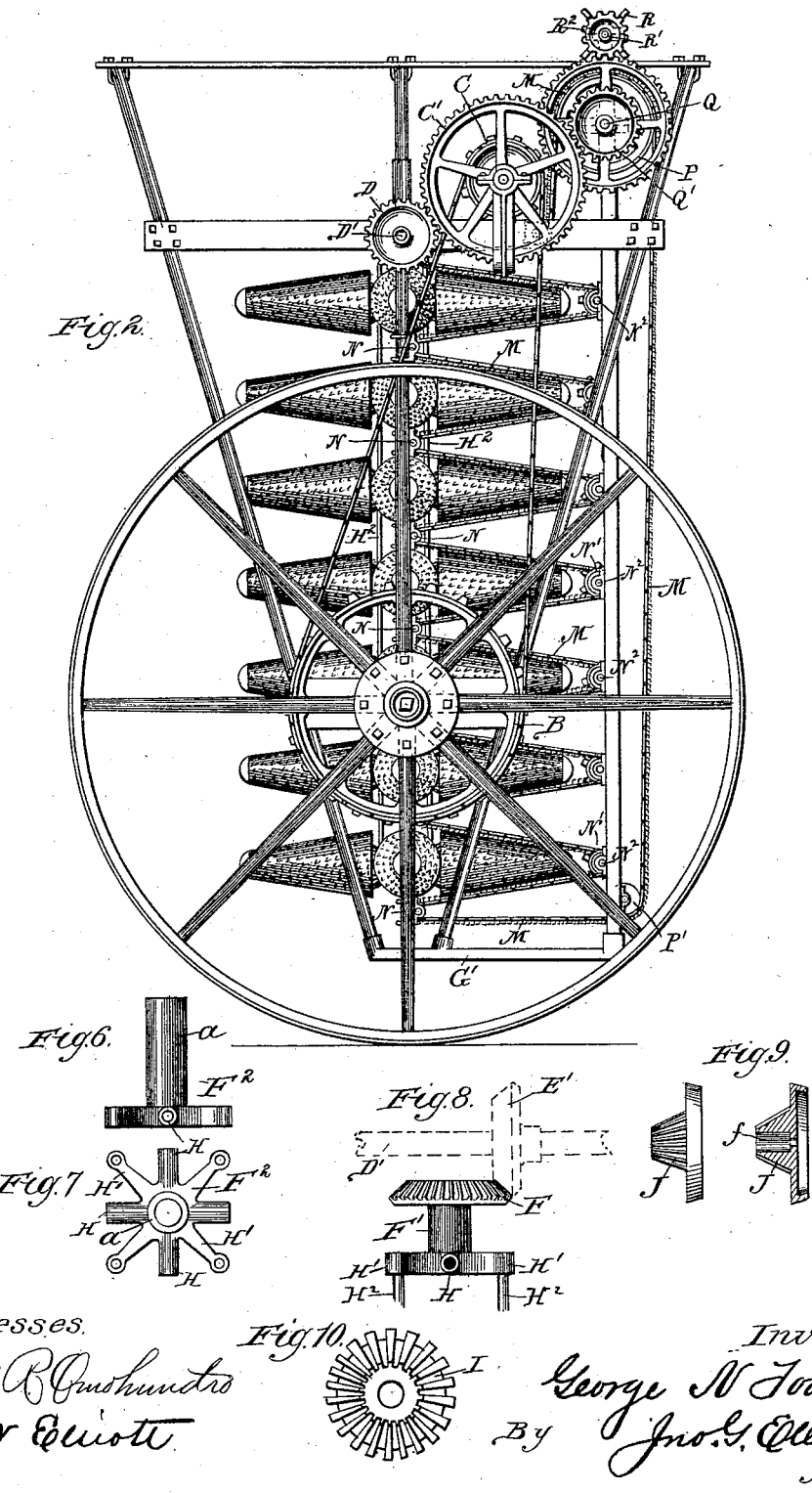
Figure 3:
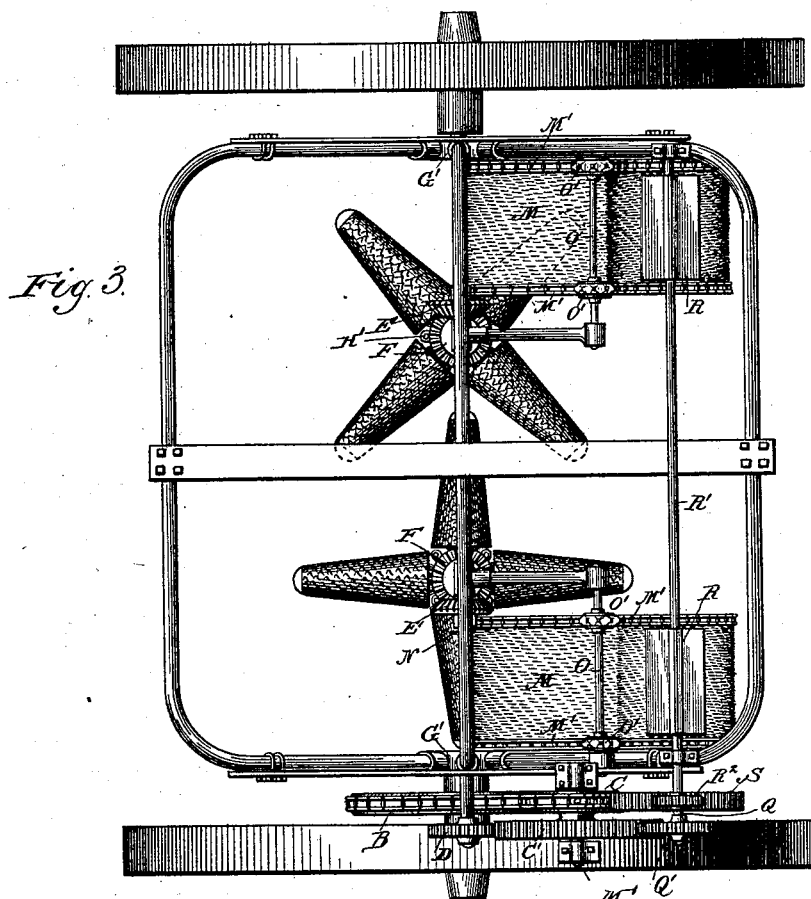
Figure 11:
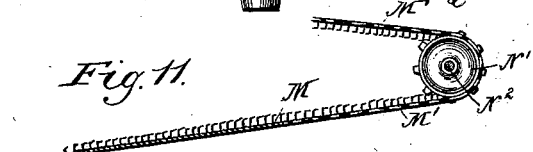
Figure 12:
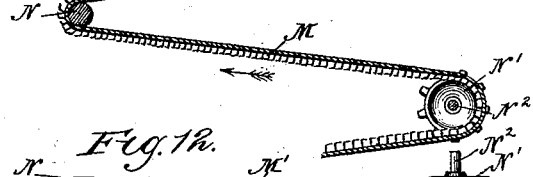
Figure 20:
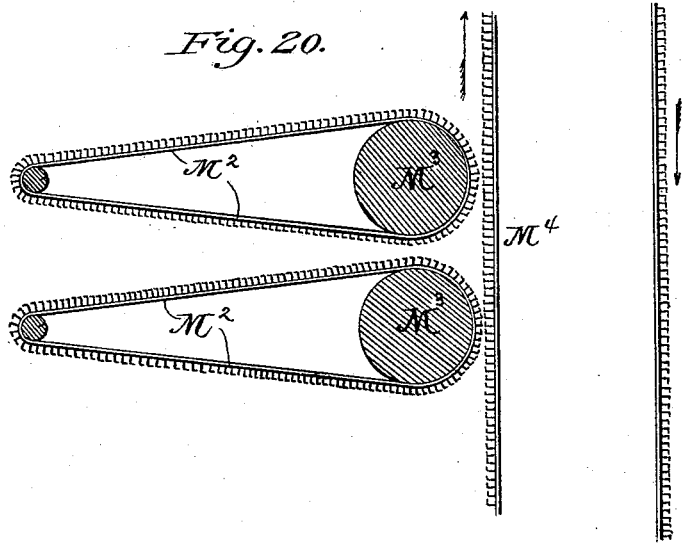

Figure 1 represents a front elevation of a cotton-harvester embodying my invention; Fig. 2, a side elevation thereof; Fig. 3, a plan view of the same; Fig. 4, a horizontal section through one set of picker-stems; Fig. 5, a central vertical section through a pair of picker-stems; Fig. 6, a detail side elevation of one of the brackets or bearings supporting the picker-stems; Fig. 7, a plan view thereof; Fig. 8, a detail side elevation of the top bracket of the picker-frame carrying the actuating-gear; Fig. 9, detail views of the gear on the inner end of the picker-stem; Fig. 10, a detail plan view of one of the fixed gears; Fig. 11, a detail view of a portion of the cleaning-belt, partly in section; Fig. 12, a plan view thereof; Fig. 13, an enlarged section through one of the picking-stems; Fig. 14, a plan view of the blank from which the picker-stem is formed; Fig. 15, a transverse sectional view on the line $x\,x$, Fig. 13; Fig. 16, an enlarged detail perspective of one of the picker-teeth; Fig. 17, a side elevation thereof; Fig. 18, a central vertical section through the same; Fig. 19, a horizontal section on the line $y\,y$, Fig. 18; Fig. 20, a detail view showing a modified construction of my cleaner-belt.

In the practical working of this machine it is designed to straddle a row and introduce the stems into the bush from both sides during the forward travel of the machine.

The frame and main driving mechanism are of the same general construction as that shown and claimed in my application for Letters Patent on a cotton-harvester, filed July 13, 1885, Serial No. 171,561. The only difference in the use of the frame is that while in the other case the vertical tie-rod A is employed only as a tie-rod, in this case it serves the double purpose of a tie-rod and axis or bearing about which the picker-frame revolves.

Rigidly secured to the hub of one of the wheels is a large drive-sprocket B, connected by a drive-chain with a smaller sprocket C, supported in a suitable bracket near the top of the frame. This smaller sprocket is rigidly secured upon one end of a short shaft, to the other end of which shaft is secured the large cog-wheel C', gearing with a smaller cog-wheel D, rigidly secured on the outer end of a cross-shaft D'. This shaft has its bearings in suitable boxes E, provided on the two sides of the middle arch, and on the upper ends of the tie-rods A. These several sprockets and gears form the main driving mechanism of my machine. Keyed to the cross-shaft D' are the bevel-gears E', meshing with and driving the bevel-gears F, cast with or rigidly secured to the upper casting or bearing of the picker-frame. The gears F and the casting or bearings F' (see Figs. 4, 5, and 8) are loosely sleeved upon the tie-rods A, extending downwardly from the cross brace or rod G and secured at their lower ends in sockets formed on the arm $G^2$ of the castings G'. The picker-frames are composed of a series of star-shaped castings $F^2$ (see Figs. 4, 5, 6, and 7) at a uniform distance apart and provided with spindles H or short shafts projecting radially therefrom, adapted to form journals for the picker-stems. They also have arms H', alternating with the spindles, through perforations in the ends of which arms pass vertical tie-rods H², connecting all the bearings or castings in such manner as to form approximately rigid frames. These arms are so disposed that the tie-rods occupy a portion of the space left by the abutting ends of the picker-stems. The upper ends of the tie-rods are rigidly secured in the arms of the upper castings F', of which the gears F form a part, whereby when the said gears are actuated by the gears E' the rotary movement is communicated to the entire picker-frames.

In order to cause the picker-stems to revolve upon their own axes during the revolutions of the picker-frames about the central tie-rods A and while the stems are being thrust into the bush, I have provided the stationary circular beveled racks or gears I, located between the extended hubs $a$ and the next adjoining casting rigidly secured to the vertical tie-rods A, into which gears mesh the small beveled gears J on the rear end of the picker-stem. Thus it will be seen that the picker-stems have both a revolution upon their own axes and about the axis of the picker-frames, which produces a continuous rotation of the picker-stems during the entire operation of the machine.

For this form of machine I prefer to use a picker-stem conical in shape, with the apex of the cone nearest the center of the bush. In the formation of the stem I employ sheet metal, the blank of which is illustrated in Fig. 14 of the drawings, in which metal teeth are struck up in the form illustrated in Fig. 16 and in such manner that the point of one tooth will be opposite the heel of the next adjoining tooth, thus producing a picking-surface in which the teeth alternate with and form guards for each other. The teeth of the picker-stems are first stamped out of the metal in a triangular form, as shown in Fig. 14, and are then raised above the surface of the blank and formed into teeth having rounded backs, with the points of the teeth in a line slightly below the highest points of the teeth. The teeth are also formed in such manner (see Fig. 19) that they are supported by curved walls on three sides, rendering the teeth of the strongest possible construction. This sheet when wound into a conical shape forms a circle in cross-section, the meeting ends being riveted or soldered together. (See Fig. 15.) The outer end of the cone toward the apex is soldered to a cap K', which forms an end bearing for the cone upon the rod L, rigidly secured to one of the spindles H of the casting F². The inner end or base of the cone is secured in like manner to the flange of a small beveled gear J, which flange and its gear constitute the butt of the stem. The gear is cored out, as shown in Fig. 13, in order to form a bearing upon one of the spindles H of the star-shaped casting F², as before described.

In practice during the travel of the picker-stems about the tie-rod and stationary gear or racks I (see Fig. 5) these small gears J engage the stationary gears I and cause the picker-stems to rotate upon their own axes, thus producing a planetary movement of the picker-stems.

In the operation of the machine, power is imparted to the upper beveled gears F through the medium of the gears E' on cross-shaft D', which causes both the entire picker-frames to revolve about the stationary tie-rods A.

The essential object of forming the picker-stems in a conical shape is to present the greatest area of picking-surface to the bush, and it will be observed that as the apex of the cone projects toward the center of the bush and the cones flare toward their bases, so that adjacent ones nearly meet, the greatest amount of picking-surface will be presented to the plant at the point where the most cotton grows.

In machines of this class it is necessary in order to insure the perfect working of the stems and prevent clogging that they should be relieved of their load after each thrust into the plant, and to this end I have provided an endless cleaning-belt M, preferably composed of card-clothing, having secured on each side thereof a link chain or belt M', (see Figs. 11 and 12,) for the purpose hereinafter described. This belt traverses the height of the machine in a zigzag line of movement across the path of travel of the picker-stems, forming flights, each flight inclined in such manner that its line of travel will be parallel with one face of the picker-stem. To produce this zigzag line of travel, the belt passes over short rollers N and sprocket-wheels N', secured at suitable points upon a stationary portion of the frame. During the travel of the belt in each flight toward the forward part of the machine, as indicated by arrows, Figs. 11 and 12, the pricking-teeth of the card-clothing are on the outer sides, and in making its turn around the roller N is free to pass directly over this roller, as the back of the clothing comes in contact with the said roller; but after passing this roller, and on its travel toward the rear of the machine, where it makes its turn for the next flight, the teeth being on the inside, if the roller were employed the teeth would be bent and soon become useless. To obviate this, I employ two sprocket-wheels N' at each end of the small cross-shaft N², over which sprockets the chain at each side of the belt travels, which suspends the belt during its turn about the shaft and prevents its teeth from coming in contact therewith.

At some convenient point near the top of the frame is secured a short shaft O, carrying on its ends two sprocket-wheels O', under which passes the belt, thence upwardly and over a large drive-pulley P, (see Fig. 2,) to which power is communicated, as hereinafter described, and thence downwardly at the rear side of the machine around a roller P', journaled at a suitable point on the stationary frame, thence forwardly in a horizontal plane until it makes the turn of the first roller, when it begins the zigzag line, as before described.

I do not limit myself to the particular construction of cleaning-belt herein described, as the same end may be attained in various ways without departing from the spirit of my invention—such, for instance, as the following: Instead of using a continuous belt traversing the machine in a zigzag path, the sprocket-wheels are dispensed with and a series of short belts M² employed, corresponding in number to the sets of picker-stems passing around the small rollers at the front and over a series of larger rollers M³ at the rear of sufficient size to make the inclined travel of the belt in a line with the inclined side of the cone, as shown in Fig. 20. Passing across the face of these large pulleys is a vertically-traveling toothed belt M⁴, which relieves the short belts of their load as rapidly as it accumulates and elevates it to a convenient point above, where the fan-wheel brushes it off into a receptacle provided for this purpose. (Not necessary to be shown.) These several short belts may be actuated by the same chain employed to drive the vertical belt, producing a uniform travel of all the cleaning-surfaces.

In order to operate the cleaning-belts, I have provided a shaft Q, extending across the machine, on the outer end of which is secured a small cog-wheel Q', gearing with the large cog-wheel C', which imparts to it the desired speed and movement in the proper direction. Although I have herein shown and described the series of short separate belts as a modified construction, I reserve the right to make both broad and specific claims to such a construction, and have done so in an application filed by me April 26, 1886, Serial No. 200,126. The pulleys over which the cleaning-belts pass are keyed to this shaft at suitable points and impart movement to the said cleaning-belt. In order to remove cotton from this belt and transfer it to a suitable receptacle provided at the rear of the machine, I employ a fan or brush R, secured upon a shaft R', extending across the machine, said shaft carrying upon its outer end a small cog-wheel R², gearing with a large cog-wheel S upon the shaft Q. The proportions of these two gears are such as to give the fan a very high speed in order to remove the cotton rapidly from the cleaning-belt.

It will be observed by reference to Fig. 3 that the stems are introduced into the plant alternately, the stem on one picker-frame entering the space between two stems on the opposing frame, and that they are of sufficient length to reach entirely across the plant. As the travel of these stems rearwardly is approximately equal to the travel of the machine forward, they will leave the plant at nearly the point of entrance therein. In practice it is designed to cause the cleaning-belt to travel at a speed slightly greater than the speed at which the stems rotate, and this is necessary, as the picking-teeth of the stems project at nearly right angles to the teeth of the cleaning-belt. However, the excess of speed, together with the inclined sides of the teeth, will render the cleaning of the picker-stems comparatively easy.

Having described my invention, what I claim, and desire to secure by Letters Patent, is—

1. In a cotton-harvester, the frame composed of one or more arched bars provided with arms or extensions projecting from the lower ends of the bars inwardly in a horizontal plane at right angles to the vertical portion of the bar, the said arms being connected by vertical tie-rods to a cross rod or brace extending across the arch in the bars near the top, said tie-rods also forming bearings and axes about which the picker-stem frames revolve, substantially as described.

2. The star-shaped casting having spindles for securing fixed shafts or rods and the picker-stems revolving on said rods, in combination with the fixed vertical shaft having a stationary circular rack or gear about which the casting and stems revolve, substantially as described.

3. A picker-stem frame composed of a series of star-shaped castings provided with spindles for securing the fixed shafts upon which the picker-stems rotate, the said castings having also projections or arms whereby they are secured together by means of vertical tie-rods, substantially as described.

4. A sheet-metal cotton-picker stem provided with teeth struck up out of the metal, having approximately a semicircular form at the point of union with the sheet or blank, whereby each tooth will be supported upon three of its sides, substantially as described.

5. In a cotton-harvester, in combination with the picker-stems, a cleaning device composed of an endless toothed belt having a zigzag or serpentine line of movement during a portion of its travel, arranged and adapted to admit the passage of picker-stems between the flights or folds thereof, substantially as described.

6. In a cotton-harvester, an endless toothed cleaner-belt and link chains attached to either edge thereof, in combination with alternating rollers and sprocket-wheels whereby the belt will be caused to travel in a zigzag or serpentine path during a portion of its travel and the teeth on said belt prevented from injury while the belt is turning with the teeth on the inside, substantially as described.

7. In a cotton-harvester, the combination of a revolving support, picker-stems projecting radially therefrom, means for rotating said stems continuously on their individual axes, and a cleaner belt or belts located in the path of movement of said stems, substantially as described.

8. In a cotton-harvester, the combination of a revolving support, series of picker-stems projecting radially therefrom, means for rotating said stems on their individual axes, and a cleaner-belt or series of belts located in the path of movement of said stems, adapted and arranged to clean each series of stems, substantially as set forth.

9. In a cotton-harvester, the combination of a revolving support, series of picker-stems projecting radially therefrom, means for rotating said stems on their individual axes, a cleaner belt or belts located in the path of movement of said stems, and mechanism for imparting to said belts a faster travel than the peripheral travel of said stems, substantially as described.

GEORGE N. TODD.

Witnesses:
W. W. ELLIOTT,
W. H. YOUNG.